United States Patent
Hage et al.

(10) Patent No.: US 9,115,463 B2
(45) Date of Patent: Aug. 25, 2015

(54) BLEACHING OF SUBSTRATES

(75) Inventors: Ronald Hage, Leiden (NL); Fabien Pierre Guy Gaulard, Leiden (NL); Kimberly Soraya Yang, Leiden (NL)

(73) Assignee: Catexel Limited, London (GB)

( * ) Notice: Subject to any disclaimer, the term of this patent is extended or adjusted under 35 U.S.C. 154(b) by 252 days.

(21) Appl. No.: 13/641,445

(22) PCT Filed: Apr. 15, 2011

(86) PCT No.: PCT/GB2011/000587
§ 371 (c)(1),
(2), (4) Date: Dec. 18, 2012

(87) PCT Pub. No.: WO2011/128649
PCT Pub. Date: Oct. 20, 2011

(65) Prior Publication Data
US 2013/0137620 A1 May 30, 2013

(30) Foreign Application Priority Data

Apr. 16, 2010 (EP) .................................... 10160194

(51) Int. Cl.
*D06L 3/02* (2006.01)
*B01J 31/18* (2006.01)
*C11D 3/39* (2006.01)

(52) U.S. Cl.
CPC ............ *D06L 3/025* (2013.01); *B01J 31/182* (2013.01); *C11D 3/3932* (2013.01); *D06L 3/021* (2013.01); *B01J 2231/70* (2013.01); *B01J 2531/0216* (2013.01); *B01J 2531/72* (2013.01)

(58) Field of Classification Search
CPC ...................................................... D06L 3/025
USPC .................................................. 510/218, 376
See application file for complete search history.

(56) References Cited

U.S. PATENT DOCUMENTS

| 5,329,024 | A * | 7/1994 | Jureller et al. ................ 549/531 |
| 5,516,738 | A * | 5/1996 | Jureller et al. ................ 502/155 |
| 7,972,386 | B2 * | 7/2011 | de Almeida et al. ............ 8/111 |
| 2001/0025695 | A1 * | 10/2001 | Patt et al. ....................... 162/72 |
| 2006/0277687 | A1 | 12/2006 | Buhler et al. |

FOREIGN PATENT DOCUMENTS

| WO | WO 02/088063 A1 | 11/2002 | |
| WO | WO 2006125517 A1 * | 11/2006 | ............... D06L 3/02 |
| WO | WO 2007/042192 A2 | 4/2007 | |
| WO | WO 2007042192 A3 * | 11/2007 | |
| WO | WO 2008/086937 A2 | 7/2008 | |

OTHER PUBLICATIONS

Odermatt et al. (ACS Symposium Series,; American Chemical Society, Washington DC, 2001).*
Hage et al., "Efficient manganese catalysts for low-temperature cleaching" Nature, 369, 637-639 (Jun. 23, 1994).
Kuhne L. et al., "Stability of a Manganese Based Peroxide Catalyst in Kraft Pulp Bleaching" in Proceedings of the International Pulp Bleaching Conference, Nova Scotia, Canada, Jun. 27-30, 2000, S171-177 (2000).
Odermatt J. et al., "A Managanese-Based Catalyst for Alkaline Peroxide Bleaching" Ch 14 in Oxidative Delignification Chemistry, D S Argyropoulos (ed), American Chemical Society, Washington DC (2001).
Reinhardt G., "Fingerprints of bleach systems" J. Molecular Catalysis A: Chemical, 251, 177-184 (2006).
European Search Report re Application No. 10160194.6-2104 Dated Apr. 1, 20122 in 5 pages.
International Search Report and Written Report re International Application No. PCT/GB2011/000587 Mailed on Jul. 14, 2011 in 11 pages.

* cited by examiner

*Primary Examiner* — Nicole M Buie-Hatcher
*Assistant Examiner* — M. Reza Asdjodi
(74) *Attorney, Agent, or Firm* — Knobbe, Martens, Olson & Bear, LLP

(57) ABSTRACT

The present invention concerns the treatment of substrates with a preformed transition metal catalyst in an aqueous solution. The transitional metal catalyst is a dinuclear Mn transitional metal catalyst and its ligand has the following formula (I):

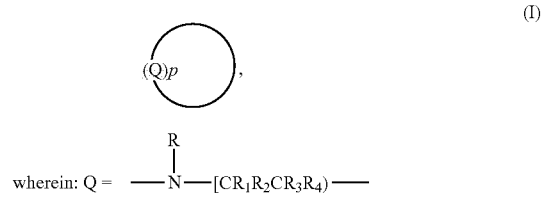

wherein: $Q = -N-[CR_1R_2CR_3R_4]-$ with R above N and p is 3.

13 Claims, No Drawings

BLEACHING OF SUBSTRATES

FIELD OF INVENTION

The present invention relates to the catalytic oxidation and/or bleaching of substrates.

BACKGROUND OF INVENTION

U.S. Pat. Nos. 5,516,738 and 5,329,024 disclose the use of a manganese transition metal catalyst of 1,4,7-Trimethyl-1,4,7-triazacyclononane ($Me_3$-TACN) for epoxidizing olefins; the transition metal catalyst has as a non-coordinating counter ion $ClO_4^-$. U.S. Pat. No. 5,329,024 also discloses the use of the free $Me_3$-TACN ligand together with manganese chloride in epoxidizing olefins.

WO 2002/088063, to Lonza A G, discloses a process for the production of ketones using $PF_6^-$ salts of manganese $Me_3$-TACN.

WO 2005/033070, to BASF, discloses the addition of an aqueous solution of Mn(II)acetate to an aqueous solution of $Me_3$-TACN followed by addition of a organic substrate followed by addition of hydrogen peroxide.

WO2006/125517 discloses the use of manganese complexes with 1,4,7-Trimethyl-1,4,7-triazacyclononane ($Me_3$-TACN) and 1,2-bis-(4,7-dimethyl-1,4,7-triazacyclonon-1-yl)-ethane ($Me_4$-DTNE) as highly-water soluble salts in bleaching.

WO08086937 and EP1934396B both disclose oxidative/bleaching processes with manganese complexes with 1,4,7-Trimethyl-1,4,7-triazacyclononane ($Me_3$-TACN) and 1,2-bis-(4,7-dimethyl-1,4,7-triazacyclonon-1-yl)-ethane ($Me_4$-DTNE) salts.

R. Hage et al. in Nature, 369, 637 (1994) teaches the optimal use of manganese complexes containing $Me_3$-TACN to be at around pH 10.0-10.5 and for the manganese complex containing $Me_4$-DTNE to be at around pH 11.0

SUMMARY OF INVENTION

The present method provides a method of bleaching of cellulosic substrates, of treatment of effluent waste streams, removal of starches and polyphenolic substrates from hard surfaces, modification of starch, oxidations of alkenes into epoxides and/or diols and/or dicarboxylic acids, alcohol into aldehyde and/or carboxylic acids, alkanes into alcohols and ketones.

We have found that by using a preformed manganese transition metal catalyst at a high pH permits effective bleaching such that levels of the preformed manganese transition metal catalyst may be kept at a minimum.

In one aspect the present invention provides a method of treating a substrate comprising the following step: contacting the substrate with an aqueous medium, having at least 1% of water and from 1 to 1500 mM of hydrogen peroxide, to form an oxidative medium, the aqueous medium comprising a transition metal catalyst, wherein the transition metal catalyst is preformed and a dinuclear Mn(II)Mn(II), Mn(II)Mn(III), Mn(III)Mn(III), Mn(III)Mn(IV) or Mn(IV)Mn(IV) transition metal catalyst, the ligand of the transition metal catalyst of formula (I):

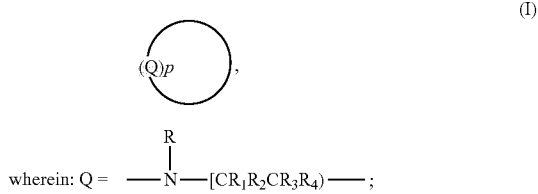

wherein: $Q = -N-[CR_1R_2CR_3R_4]-$ ;

p is 3;
R is independently selected from: hydrogen; C1-C6-alkyl, C2OH; C1COOH; and, pyridin-2-ylmethyl and one of R is linked to the N of another Q from another ring via an ethylene bridge;
R1, R2, R3, and R4 are independently selected from: H; C1-C4-alkyl; and, C1-C4-alkylhydroxy, wherein the oxidative medium has a pH in the range 11 to 13 and the concentration of the transition metal catalyst is in the range from 0.0001 to 1.5 microM.

The transition metal catalyst may be a single transition metal catalyst or a mixture of the transition metal catalysts as defined above.

DETAILED DESCRIPTION OF THE INVENTION

Transition Metal Catalyst

The manganese transition metal catalyst used may be non-deliquescent by using counter ions such as $PF_6^-$ or $ClO_4^-$, it is preferred for industrial substrates that the transition metal complex is water soluble. It is preferred that the preformed transition metal is in the form of a salt such that it has a water solubility of at least 50 g/l at 20° C. Preferred salts are those of chloride, acetate, sulphate, and nitrate. These salts are described in WO 2006/125517.

It will be understood from the foregoing description that begins of formula (I) may alternatively be represented by the following structure:

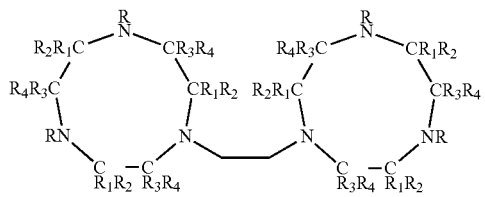

wherein R, R1, R2, R3, and R4 are as herein defined.
Preferably R is independently selected from: hydrogen, CH3, C2H5, CH2CH2OH and CH2COOH.
More preferably R, R1, R2, R3, and R4 are independently selected from: H and Me.
Most preferably, the catalyst is derived from the ligand 1,2,-bis-(4,7,-dimethyl-1,4,7,-triazacyclonon-1-yl)-ethane (Me-4-DTNE).
The preformed transition metal catalyst salt is preferably a dinuclear Mn(III) or Mn(IV) complex with at least one $O^{2-}$ bridge. For example, the preformed transition metal catalyst salt may be a salt of the metal complex $[Mn^{III}Mn^{IV}(\mu\text{-}O)_2(\mu\text{-}CH_3COO)(Me_4\text{-DTNE})]^{2+}$.
Preferably, the pH of the oxidative medium is from pH 11.2 to 12.8, more preferably from pH 11.5 and 12.5.
Preferably, the concentration of the transition metal catalyst is from 0.0005 to 1 microM, more preferably from 0.001 to 0.7 microM.

Substrates

Cellulosic substrates are found widely in domestic laundry, industrial and institutional laundry, wood-pulp, cotton processing industries and the like. Although target cleaning can be different, it is the objective in all cases to bleach these substrate, i.e., either removing undesired stains or solids (laundry applications), or bleaching polyphenolic substrates that are present in the natural cotton materials (raw cotton and wood pulp).

For laundry (both domestic as well as institutional & industrial cleaning), bleaching agents are used for cleaning and hygiene purposes. Especially hydrogen peroxide and peracids are being employed widely. As highlighted above, hydrogen peroxide can be activated by catalysts to allow cleaning at lower bleaching temperatures.

The term "crockery" encompasses plates, dishes and other eating (e.g., cutlery) and serving tableware, usually made of some ceramic material; crocks, earthenware vessels, especially domestic utensils.

Synthetic Applications

Although not limited, examples include alkene oxidations into epoxide, cis-diol, trans-diol (formed from the epoxide upon alkaline hydrolysis), and via C—C cleavage into the carboxylic acid. Examples (but not limited to these examples) of alkenes to give epoxide include cyclooctene conversions, styrene, 1-octene, dimethylmaleate. It should be noted that, as persons skilled in the art will appreciate, that these epoxides may be hydrolysed into trans-diol groups.

In this regard, alkenes, aldehydes, and alkanes are preferred substrates and it is preferred that when these substrates are oxidised they are present (including isomers and enantiomers) at least 90% purity; this level of purity does not include the oxidative medium.

This invention is supported by the following non-limiting examples.

EXPERIMENTAL $[Mn_2O_2(CH_3COO)(Me_4\text{-}DTNE)](PF_6)_2$ was obtained as disclosed elsewhere (K.-O. Olivier et al., J. Am. Chem. Soc., 120, 13104-13120 (1998)).

Experiment 1

Bleaching of Pulp with Very Low Levels of Catalyst ($[Mn_2O_2(CH_3COO)(Me_4\text{-}DTNE)](PF_6)_2$)

Softwood Pulp

Softwood pulp with a starting ISO-brightness of 84.3 was treated as follows: 1 g of oven-dry pulp was added to a series of mini-bottles containing various levels of catalyst, 4 kg/t $H_2O_2$ (equals to 5.9 mM $H_2O_2$), and 0.5 kg/t DTPMP (Diethylenetriaminepenta(methylene-phosphonic acid)—(ex Solutia; trade name Dequest 2066; purity is 32%). The pH-values were adjusted to desired level @pH 11.5 (measured at 20° C.).

Note 1: This softwood pulp has been delignified in a $O_2$-delignification step, and partly further bleached by a $ClO_2$ step, a $Ep(H_2O_2)$ and a $ClO_2$ step.

Note 2: In practice, pulp was used that contained 30% dry matter and 70% water (30% dry content). Therefore 3.33 g of 'wet' pulp was used for each experiment.

Note 3: All experiments were carried out at 5% consistency.

The mini-bottles are put in a pre-heated water bath (70° C.) for 1 hour and are shaken throughout the bleaching process. Subsequently the pulp mixture is filtrated through a Buchner funnel, washed with copious amounts of demineralised water and dried overnight at ambient conditions. The optical properties of the pulp heaps were then measured using a Minolta spectrophotometer CM-3700d, using L, a, b values which are converted to whiteness values through the following formula:

$$100 - \sqrt{(100-L)^2 + a^2 + b^2}$$

The ISO-Brightness values are calculated through the following formula:

ISO-Brightness=(1.98*whiteness)−100.3

The results of the experiment are given in Table 1.

TABLE 1

ISO-Brightness results of bleaching softwood pulp using various levels of $[Mn_2O_2(CH_3COO)(Me_4\text{-}DTNE)](PF_6)_2$ at pH 11.5 at 70° C. for 60 minutes. The error of the experiments is around 0.4 ISO Brightness values.

| $[Mn_2O_2(CH_3COO)(Me_4\text{-}DTNE)](PF_6)_2$ (micromolar) | Brightness (ISO %) |
|---|---|
| 0 (blank) | 86.4 |
| 0.06 | 87.2 |
| 0.12 | 87.3 |
| 0.3 | 87.9 |

Eucalyptus Hardwood Pulp

The same set of experiments were conducted using eucalyptus hardwood pulp (starting brightness of 72.0% ISO). In the solutions various levels of catalyst were added and 3 kg/t $H_2O_2$ (equals to 4.4 mM $H_2O_2$). The pH-values were adjusted to desired level @pH 11.6 (measured at 20° C.).

Note 1: This eucalyptus pulp has been delignified in a $O_2$-delignification step, and partly further treated by an acidic wash and a $ClO_2$ step.

Note 2: In practice, pulp was used that contained 31.4% dry matter and 68.6% water (31.4% dry content). Therefore 3.18 g of 'wet' pulp was used for each experiment.

Note 3: All experiments were carried out at 5% consistency.

The results of the experiment are given in Table 2.

TABLE 2

ISO-Brightness results of bleaching eucalyptus hardwood D1 using various levels of $[Mn_2O_2(CH_3COO)(Me_4\text{-}DTNE)](PF_6)_2$ at pH 11.6 at 85° C. for 90 minutes.

| $[Mn_2O_2(CH_3COO)(Me_4\text{-}DTNE)](PF_6)_2$ (micromolar) | Brightness (ISO %) |
|---|---|
| 0 (blank) | 81.5 (0.11) |
| 0.16 | 83.0 (0.12) |
| 0.4 | 83.3 (0.04) |

An additional set of experiments was carried out using another batch of eucalyptus hardwood pulp (starting brightness of 71.5% ISO), that has been treated before with hot $ClO_2$. This set of bleaching experiments was also carried out at 5% consistency, but now using 5 kg/t $H_2O_2$. The results of these bleaching experiments are given in Table 3.

TABLE 3

ISO-Brightness results of bleaching eucalyptus hardwood D1 using various levels of [Mn$_2$O$_2$(CH$_3$COO)(Me$_4$-DTNE)](PF$_6$)$_2$ at pH 12.0, 12.5, and 13.0 at 80° C. for 90 minutes.

| [Mn$_2$O$_2$(CH$_3$COO)(Me$_4$-DTNE)](PF$_6$)$_2$ | Brightness (% ISO) |
|---|---|
| pH 12.0; 0 μM | 80.7 (0.4)-4 |
| pH 12.0; 0.0005 μM | 81.3 (0.1)-4 |
| pH 12.0; 0.05 μM | 82.2 (0.3)-4 |
| pH 12.5; 0 μM | 80.7 (0.6)-4 |
| pH 12.5; 0.008 μM | 82.3 (0.0)-4 |
| pH 12.5; 0.08 μM | 83.4 (0.1)-2 |
| pH 13.0; 0 μM | 80.3 (0.2)-4 |
| pH 13.0; 0.025 μM | 82.5 (0.5)-2 |
| pH 13.0; 0.082 μM | 83.0 (0.4)-2 |

Experiments are done in fourfold or two-fold (values given after standard deviations).

The results gathered in Table 1 and 2 show that the addition of [Mn$_2$O$_2$(CH$_3$COO)(Me$_4$-DTNE)](PF$_6$)$_2$ at very low levels leads to an increase in Brightness of the pulp samples as compared to the references. Even levels as low as 0.06 microM gives a significant bleach effect under these conditions.

Moreover, the results gathered in Table 3 show that the addition of [Mn$_2$O$_2$(CH$_3$COO)(Me$_4$-DTNE)](PF$_6$)$_2$ at levels as low as 0.0005 microM give a significant bleach effect under these conditions. Further, these data show that at pH 11.6, 12.0, pH 12.5, and pH 13.0, a significant benefit of the catalyst can be obtained.

Experiment 2

Raw cotton with a Berger Whiteness value of 7.5+/−1.0 was treated as follows: 2 grams of the cotton was immersed into mini-bottles containing a 20 ml solution (cloth/liquor ratio of 1/10) containing various levels of [Mn$_2$O$_2$(CH$_3$COO)(Me$_4$-DTNE)](PF$_6$)$_2$, 35 mM to 120 mM H$_2$O$_2$ (equals to 3 to 10 ml/l 35% w/w H$_2$O$_2$), pH-value adjusted to desired level, 1 g/l Sandoclean PCJ (ex Clariant). Different levels of Dequest 2066 were used: 0.9 g/l Dequest 2066, ex Solutia (purity of 32%) was used (=DTPMP—Diethylenetriamine-penta(methylene-phosphonic acid) for the data given in table 4. For the experiments shown in table 5, 0.3 g/l Dequest 2066 solution was used.

The mini-bottles were put in a pre-heated water bath (77° C.) for 30 to 35 minutes (the temperature of the bleaching solutions in the bottles is then 75° C.). Subsequently the cotton swatches were rinsed twice with 1 liter of hot demineralised water (95° C.), then with 1 liter of 40° C. demineralised water containing 1 ml/l acetic acid and then washed with copious amounts of demineralised water and dried overnight under ambient conditions. The optical properties of the cloths were then measured using a Minolta spectrophotometer CM-3700d, using X, Y, Z values which are converted to Berger Whiteness values.

The values of the whiteness are expressed in Berger units. The formula of Berger whiteness is given below:

$$W_{berger} = Y + a \cdot Z - b \cdot X, \text{ where } a=3.448 \text{ and } b=3.904.$$

The values X, Y, Z are the coordinates of the achromatic point. The results of the experiments are given in Table 4.

TABLE 4

Berger Whiteness results of bleaching raw cotton using various levels of [Mn$_2$O$_2$(CH$_3$COO)(Me$_4$-DTNE)](PF$_6$)$_2$ at various pH's at 75° C. for 30 to 35 minutes.

| Peroxide (mmolar) | Reaction time (minutes) | pH | [Mn$_2$O$_2$(CH$_3$COO)(Me$_4$-DTNE)](PF$_6$)$_2$ (micromolar) | Whiteness (Berger) |
|---|---|---|---|---|
| 75 | 30 | 11.0 | 0 (blank) | 54.7 ± 1.2 |
| 75 | 30 | 11.0 | 0.1 | 57.5 ± 0.8 |
| 75 | 30 | 11.0 | 0.25 | 59.4 ± 0.6 |
| 75 | 30 | 11.0 | 0.5 | 59.2 ± 0.7 |
| 75 | 30 | 11.0 | 1 | 61.5 ± 0.1 |
| 75 | 30 | 11.0 | 1.5 | 61.2 ± 0.5 |
| 75 | 30 | 12.0 | 0 (blank) | 60.6 ± 0.8 |
| 75 | 30 | 12.0 | 0.1 | 63.5 ± 0.6 |
| 75 | 30 | 12.0 | 0.25 | 65.6 ± 0.7 |
| 75 | 30 | 12.0 | 0.5 | 66.8 ± 0.6 |
| 75 | 30 | 12.0 | 1 | 68.6 ± 0.6 |
| 75 | 30 | 12.0 | 1.5 | 69.7 ± 0.6 |
| 120 | 35 | 12.0 | 0 (blank) | 68.1 ± 1.0 |
| 120 | 35 | 12.0 | 0.1 | 70.3 ± 0.7 |
| 120 | 35 | 12.0 | 0.25 | 71.8 ± 0.4 |
| 120 | 35 | 12.0 | 0.5 | 73.3 ± 0.2 |
| 120 | 35 | 12.0 | 1 | 74.0 ± 0.8 |
| 120 | 35 | 12.0 | 1.5 | 74.5 ± 0.6 |
| 35 | 35 | 12.0 | 0 (blank) | 52.5 ± 0.7 |
| 35 | 35 | 12.0 | 0.1 | 55.8 ± 0.5 |
| 35 | 35 | 12.0 | 0.25 | 56.8 ± 0.7 |
| 35 | 35 | 12.0 | 0.5 | 58.6 ± 0.7 |
| 35 | 35 | 12.0 | 1.0 | 60.3 ± 0.4 |
| 35 | 35 | 12.0 | 1.5 | 61.1 ± 0.6 |
| 58 | 35 | 12.0 | 0 (blank) | 59.3 ± 1.1 |
| 58 | 35 | 12.0 | 0.1 | 62.9 ± 0.9 |
| 58 | 35 | 12.0 | 0.25 | 64.1 ± 0.3 |
| 58 | 35 | 12.0 | 0.5 | 64.7 ± 0.7 |
| 58 | 35 | 12.0 | 1 | 66.9 ± 0.5 |
| 58 | 35 | 12.0 | 1.5 | 67.8 ± 0.9 |

The results gathered in Table 4 show that under the range of pH and levels of peroxide tested the addition of [Mn$_2$O$_2$(CH$_3$COO)(Me$_4$-DTNE)](PF$_6$)$_2$ always leads to an increase in the whiteness of the swatches versus the blank (without catalyst), even with very low levels (an increase by 2-3 Berger is obtained by addition of only 0.1 micromol/L of the catalyst).

TABLE 5

Berger Whiteness results of bleaching raw cotton using various levels of [Mn$_2$O$_2$(CH$_3$COO)(Me$_4$-DTNE)](PF$_6$)$_2$ at various pH's at 75° C. for 30 minutes.

| H$_2$O$_2$ (mM) | Reaction time (minutes) | pH | [Mn$_2$O$_2$(CH$_3$COO)(Me$_4$-DTNE)](PF6)$_2$ (μM) | Whiteness (Berger) |
|---|---|---|---|---|
| 75 | 30 | 12.5 | 0 (blank) | 61.6 ± 0.4 |
| 75 | 30 | 12.5 | 0.05 | 63.4 ± 0.9 |
| 75 | 30 | 12.5 | 0.1 | 65.1 ± 0.5 |
| 75 | 30 | 12.5 | 0.5 | 68.2 ± 0.4 |
| 75 | 30 | 12.5 | 1 | 69.8 ± 0.7 |
| 75 | 30 | 12.5 | 2 | 71.3 ± 0.6 |
| 75 | 30 | 13.0 | 0 (blank) | 61.4 ± 0.6 |
| 75 | 30 | 13.0 | 0.05 | 63.2 ± 0.7 |
| 75 | 30 | 13.0 | 0.1 | 65.8 ± 0.5 |
| 75 | 30 | 13.0 | 0.5 | 68.3 ± 0.4 |
| 75 | 30 | 13.0 | 1 | 70.2 ± 0.3 |

Taken together, the results gathered in Tables 4 and 5 show that, under the range of pH and levels of peroxide tested, the addition of [Mn$_2$O$_2$(CH$_3$COO)(Me$_4$-DTNE)](PF$_6$)$_2$ always leads to an increase in the whiteness of the swatches versus the blank (without catalyst), even at pH 12.5 and 13.0. Even with very low levels of catalyst (0.05 μM) an increase by 2-3 Berger is obtained.

Overall, the data support the claim on the range of pHs to be applied (11.0-13.0), ranging from low end (data on pH 11—table 4; pH 11.6—table 1 and 2, pH 12.0/pH 12.5/pH 13.0—tables 2, 3, 4, 5) and on the range of catalyst that can give significant benefits (from 0.0005 μM—table 3, till 1.5 μM—tables 4 and 5).

We claim:

1. A method of treating a substrate comprising the following step:

contacting the substrate with an aqueous medium comprising at least 1% of water, from 1 to 1500 mM of hydrogen peroxide, and a preformed transition metal catalyst to form an oxidative medium; wherein the transition metal catalyst is a dinuclear Mn(II)Mn(II), Mn(II)Mn(III), Mn(III)Mn(III), Mn(III)Mn(IV) or Mn(IV)Mn(IV) transition metal catalyst having a ligand of formula (I):

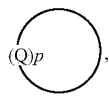

(I)

wherein: $Q = $ ——N——$[CR_1R_2CR_3R_4]$——;

p is 3;

R is independently selected from the group consisting of: hydrogen, $C_1$-$C_6$-alkyl, $CH_2CH_2OH$, $CH_2COOH$, and pyridin-2-ylmethyl; and one of R is linked to the N of another Q from another ring via an ethylene bridge;

$R_1$, $R_2$, $R_3$, and $R_4$ are independently selected from the group consisting of:

H, $C_1$-$C_4$-alkyl, and $C_1$-$C_4$-alkylhydroxy; and wherein the oxidative medium has a pH in the range 11.2 to 12.8 and the concentration of the transition metal catalyst is in the range from 0.0005 to 0.08 microM.

2. The method according to claim 1, wherein R is independently selected from: hydrogen, $CH_3$, $C_2H_5$, $CH_2CH_2OH$ and $CH_2COOH$.

3. The method according to claim 1, wherein R, $R_1$, $R_2$, $R_3$, and $R_4$ are independently selected from: H and Me.

4. The method according to claim 1, wherein the catalyst is derived from 1,2,-bis-(4,7,-dimethyl-1,4,7,-triazacyclonon-1-yl)-ethane (Me4-DTNE).

5. The method according to claim 4, wherein the pH of the oxidative medium is from pH 11.2 to 12.8.

6. The method according to claim 4, wherein the preformed transition metal catalyst salt is a dinuclear Mn(III) or Mn(IV) complex with at least one $O^{2-}$ bridge.

7. The method according to claim 4, wherein the substrate is selected from the group consisting of: cellulosic substrate, crockery.

8. The method of treating a substrate according to claim 1, wherein the pH of the oxidative medium is from pH 11.5 and 12.5.

9. The method according to claim 1, wherein the preformed transition metal catalyst salt is a dinuclear Mn(III) or Mn(IV) complex with at least one $O^{2-}$ bridge.

10. The method according to claim 1, wherein the preformed transition metal catalyst salt is a salt of the metal complex $[Mn^{III}Mn^{IV}(\mu-O)_2(\mu-CH_3COO)(Me_4\text{-}DTNE)]^{2+}$.

11. The method according to claim 1, wherein the substrate is selected from the group consisting of: cellulosic substrate, crockery.

12. The method according to claim 11, wherein the substrate is a cellulosic substrate or crockery.

13. The method according to claim 1, wherein the treating of the substrate occurs in a mechanical dishwasher.

* * * * *